June 27, 1933. L. M. CLEMENT 1,915,290
RADIORECEIVERS FOR CONVEYANCES
Filed Oct. 5, 1929 2 Sheets-Sheet 1
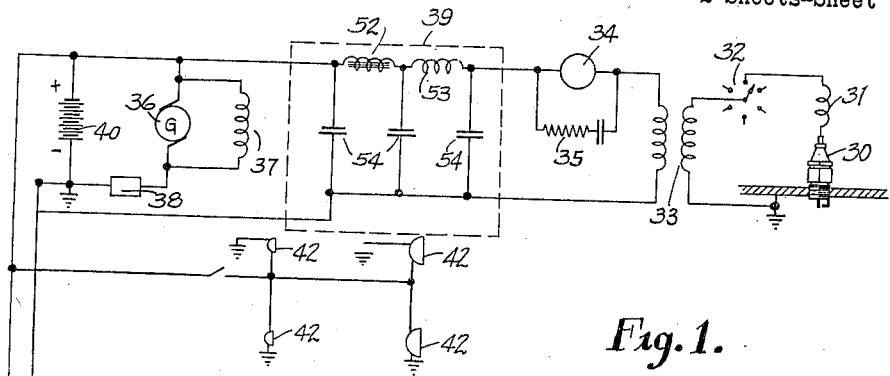
Fig. 1.
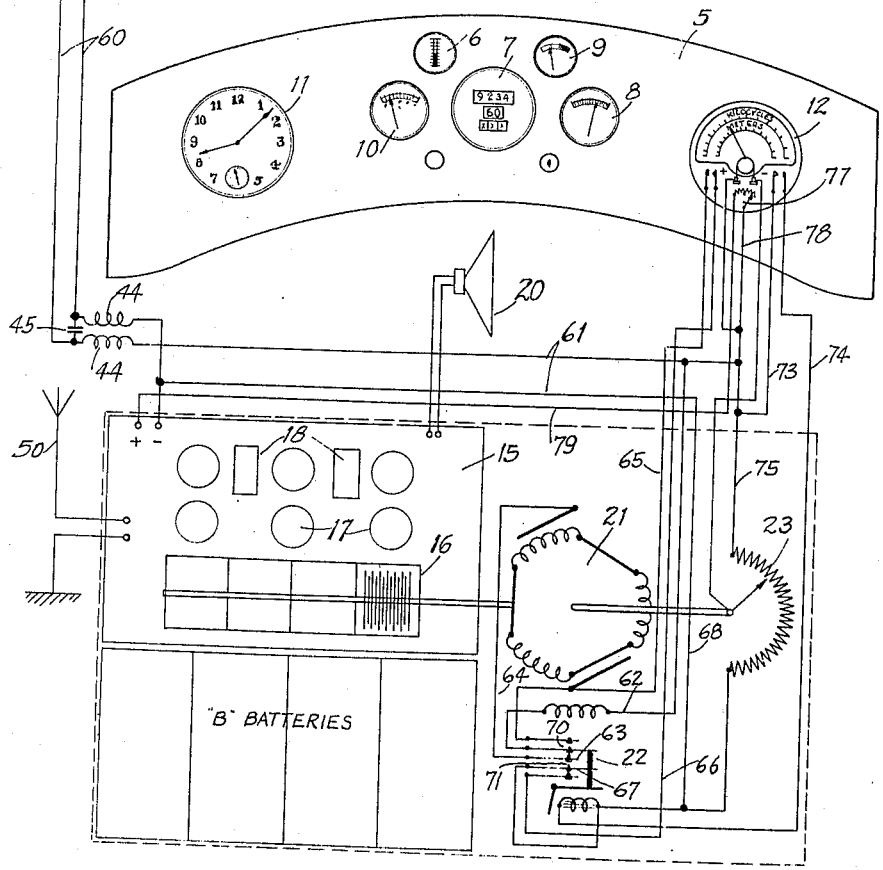
INVENTOR
LEWIS M. CLEMENT.
BY
Irl R. Goshaw
ATTORNEY

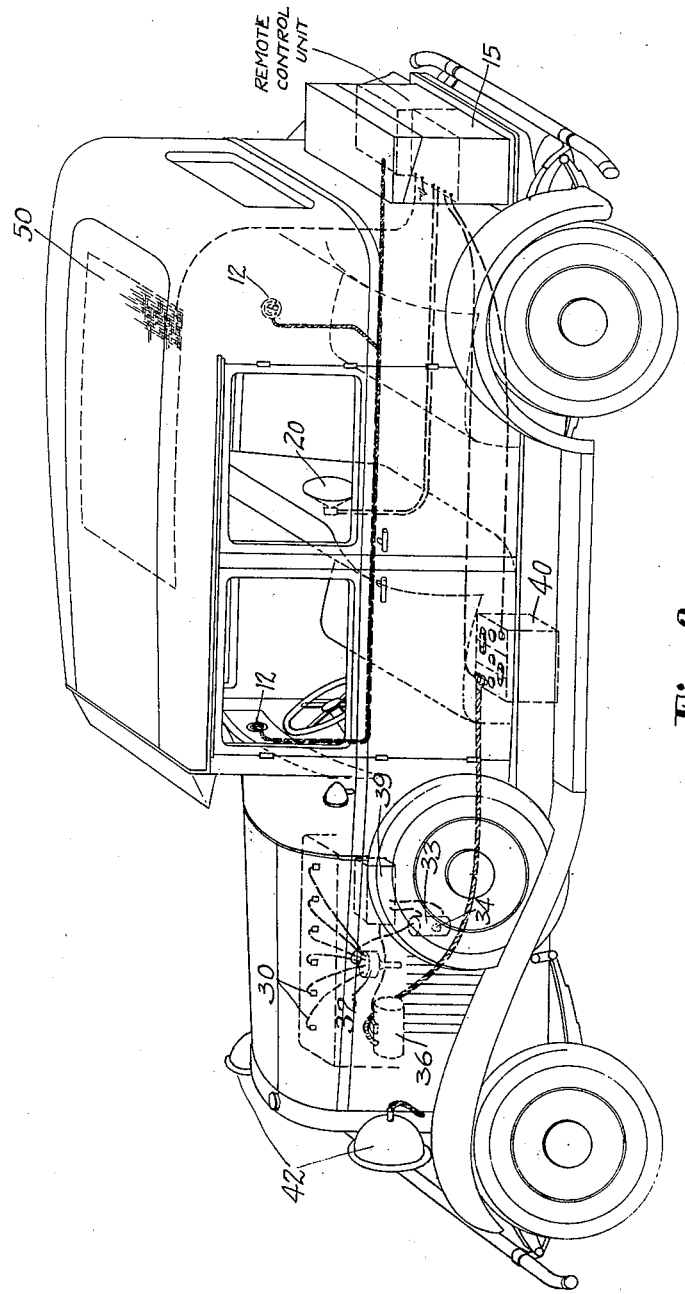

Patented June 27, 1933

1,915,290

UNITED STATES PATENT OFFICE

LEWIS M. CLEMENT, OF MOUNTAIN LAKES, NEW JERSEY, ASSIGNOR TO BRANDES, LABORATORIES, INCORPORATED, OF NEWARK, NEW JERSEY, A CORPORATION OF NEW JERSEY

RADIORECEIVER FOR CONVEYANCES

Application filed October 5, 1929. Serial No. 397,534.

This invention relates to radio receivers and particularly to means for controlling such receivers from a point or points located at a distance from the receivers.

An object of this invention is to control radio receivers from a distant point.

Another object of the invention is to control a radio receiver located in a moving conveyance from a point distant from said receiver but also in the conveyance.

A still further object of this invention is to control a receiver located in a conveyance from a point distant from the receiver without interference from the motive means employed for operating the conveyance.

The present invention contemplates the use of a radio receiver in motor cars, motor boats and aircraft, the location of the receiver being at the most advantageous position in the conveyance to permit optimum operation of the receiver and the least interference from the motive system. Heretofore it has been necessary to place the radio receiver within the reach of the operator, which meant that in the case of an automobile, the receiver had to be located on the dash thereof or within reach of the driver. This was true in motor boats and also aircraft, the latter requiring the location of the receiver in the cockpit.

A feature of the present invention is that the receiver may be located under the back seat or in the trunk located in the rear of automobiles, which permits of the proper shielding of the receiver. In the case of aeroplanes, the receiver may be located on the tip of the wing or in the tail portion of the fuselage. There is also sufficient space in these locations to provide an efficient and good receiver which may be controlled from the driver's seat, in accordance with the present invention.

Another feature of the invention is the supplying of energy from the battery employed in the conveyance, filter means being employed to reduce interference arising from the high frequency currents in the ignition system of the motive means.

Other advantages will be apparent, and the invention more fully understood, by reference to the accompanying drawings, in which;

Figure 1 is a diagrammatical view of the system embodying the invention; and,

Figure 2 is a phantom view of an automobile in which the system has been installed.

In Figure 1 the control board or dash 5 has mounted thereon the usual instruments such as a gasoline gauge 6, speedometer 7, ammeter 8, thermostatic indicator 9, oil gauge 10, clock 11 and a remote control unit 12. The radio receiver 15 is shown diagrammatically as including a gang condenser 16, tubes 17, transformers 18, with the "B" batteries, all of which may be located under the back seat of an automobile, in the stern of the motor boat, or on the wing or in the tail of an aeroplane.

A loud speaker 20 may be located in the back portion of the front seat in an automobile as shown in Figure 2, or under the dash of an automobile, in the cabin of a motor boat, or in the cockpit of an aeroplane.

The remote control system comprising the unit 12, the motor 21, reversing relay 22, and potentiometer 23 is similar to that shown in Levy co-pending application 55,989 filed September 12, 1925.

The upper portion of the figure shows the wiring system for the automobile of Figure 2 but is representative of any internal combustion ignition system which may be changed in accordance with the invention. This system includes spark plugs 30, tuning coil 31, distributor 32, high tension transformer 33, contactor 34, with its shunt 35, motor generator 36 with field coil 37, cut-out 38 and a filter section 39. An engine starting battery 40 supplies the power for lights 42 and filament current to the tubes 17. Radio high frequency choke coils 44 with their associate by-pass condenser 45 are inserted in the battery leads to the filaments. An antenna 50 may be installed in the top of an automobile as a screen mesh or loop, as a mast aerial in a motor boat, in the wings of an aeroplane, or as a drop wire on any type of aircraft.

The filter section 39, comprises an audio frequency choke 52 and a radio frequency choke 53 in series together with shunt condensers 54. This filter section prevents the generation of high frequency current which would be broadcast from the ignition wires and picked up by the antenna 50 thereby interfering with the reception by the radio receiver 15. Another feature to eliminate the noises from the ignition system is the tuning coil 31 which tunes the high frequency generated at the spark plugs to a frequency outside the broadcast range so as not to interfere with the reception of the receiver. The radio frequency coils 44 and condenser 45 prevents any high frequencies from getting into the receiver through the filaments of the tubes 17.

The operation of the circuit is as shown in the Levy application, supra, and briefly is as follows:—

The closing of the left hand contact in the remote control unit 12 operates the tuning-unit in one direction by impressing the voltage of the battery 40 on the motor 21 over conductors 60, 61, 62, contact 63, conductors 64, 65, left hand contact of unit 12, conductor 66, contact 67 and conductor 68. The closing of the right hand contact of the remote control unit operates relay 22 reversing the connection to the motor, the motor now being supplied over the conductors 60, 61, 62, contact 70, conductor 64, contact 71, and conductor 68. The relay 22 is energized by the closing of the right hand contact of unit 12 over conductors 60, 61, 73, 74, coil of relay 22 and conductor 68. The tuning of the receiver is indicated on the remote control unit electrically by the operation of the potentiometer 23. The movable arm of this potentiometer is connected directly to the shaft of the gang condenser unit 16, and thereby taps off a voltage corresponding to the angular position of this unit, which is indicated on the voltmeter of the unit which has been calibrated in meters and kilocycles. The battery 40 is directly connected across this stationary portion of the potentiometer over conductors 60, 61, 75 and 68. Volume control is obtained by the variable resistance 77 in series with the filaments of the tubes 17 over conductors 60, 61, 78 and 79. This control resistance may also serve as a start and stop switch.

In Figure 2 the system is shown installed in a well known automobile model. The filter 39 is shown located between the generator 36 and the transformer 33 and the contactor 34 under the hood of the motor. Control units 12 are shown mounted on the instrument board of the car, and on the walls of the rear portion of the car, while the loud speaker 20 is mounted on the back portion of the front seat. The aerial 50, shown as a screen, is installed in the top of the car. The receiver itself is mounted in the trunk, which is usually of metal, forming a shield for the receiver from any outside stray interferences which may effect reception. It is also understood that this receiver may be mounted under the rear seat or in any convenient location on the car, such as separate casing mounted on the running board. Further, the system may be installed in motor buses and railway cars, the receiver being in an out-of-the-way place, while the control unit is placed near the driver or operator.

As illustrated in Figure 2, two control units 12 are shown, one for the convenience of the occupants of the rear seat of the car, which may be located in the side of the tonneau, and one for the convenience of the driver, located on the dash. If it is desired to have only one unit, the cable thereof may not be fixedly attached to the car, but left free to enable the unit being passed back and forth between those in the front seat and those in the rear seat.

Although this invention has been shown embodied in a system applied to an automobile, it is to be understood that it is equally adaptable to motor boats and aircraft, and is to be considered as limited only by the scope of the appended claims.

What is claimed is:

1. In a radio receiver for conveyances, an electrical energy source for said conveyance, means for excluding electrical oscillation surges from said electrical energy source, said means comprising a radio frequency filter and an audio frequency filter, means for supplying energy to said receiver from said electrical energy source, and means for controlling said receiver from a point remote therefrom.

2. In combination, a vehicle having an ignition system, a radio receiver carried by said vehicle, means for supplying current from a common source to said ignition system and said radio receiver, and means for tuning the oscillations generated in said ignition system to a frequency outside the frequency band of said radio receiver, said means comprising tuning coils connected to said ignition system.

Signed at Newark in the county of Essex and State of New Jersey, this 28th day of September A. D. 1929.

LEWIS M. CLEMENT.